United States Patent [19]

Kolner

[11] Patent Number: 5,033,826

[45] Date of Patent: Jul. 23, 1991

[54] HIGH TEMPORAL RESOLUTION OPTICAL INSTRUMENT

[75] Inventor: Brian H. Kolner, Woodside, Calif.

[73] Assignee: Hewlett-Packard Company, Palo Alto, Calif.

[21] Appl. No.: 328,823

[22] Filed: Mar. 27, 1989

[51] Int. Cl.$^5$ .......................... G02F 1/01; G02B 6/10; G02B 5/18

[52] U.S. Cl. ................................ 350/355; 350/96.14; 350/162.23

[58] Field of Search ................. 350/355, 96.14, 162.23

[56] References Cited

U.S. PATENT DOCUMENTS

| | | | |
|---|---|---|---|
| 3,724,926 | 4/1973 | Lee | 350/355 |
| 3,795,433 | 3/1974 | Channin | 350/96.14 |
| 4,251,130 | 2/1981 | Marcatili | 350/355 |

OTHER PUBLICATIONS

Treacy, E. B.: "Optical Pulse Compression with Diffraction Gratings", IEEE Journal of Quantum Electronics, vol. QE-5 #6, Sep. 1969; pp. 454–458.
Beaud et al.: "High Resolution Optical Time Domain Reflectometry for the Investigation of Integrated Optical Devices"—Institute of Applied Phys.; University of Bern, date prior to filing date.
Dolfi, D. W.: "Traveling-Wave 1.3 µm Interferometer Modulator with High Bandwidth, Low Drive Power, and Low Loss", Applied Optics, vol. 25, Aug. 1986, pp. 2479–2480.
Nazarathy et al.: "Real Time Long Range Complementary Correlation Optical Time Domain Reflectometer", Journal of Lightwave Technology vol. 7 #1, Jan. 1989, pp. 24–38.
Peng et al.: "Theory of Periodic Dielectric Waveguides", IEEE Transactions on Microwave Theory and Techniques vol. MTT 23 #1, Jan. 1975; pp. 123–133.
Joseph A. Giordmaine et al., "Compression of Optical Pulses", IEEE Journal of Quantum Electronics, vol. QE-4, No. 5, May 1968, pp. 252–255.
Michel A. Duguay et al., "Optical Frequency Shifting of a Mode-Locked Laser Beam", IEEE Journal of Quantum Electronics, vol. QE-4, No. 4, Apr. 1978, pp. 238–242.
John K. Wigmore et al., "Temporal Compression of Light", IEEE Journal of Quantum Electronics, vol. QE-14, No. 8, Aug. 1968, pp. 252–255.

Primary Examiner—Eugene R. LaRoche
Assistant Examiner—Evelyn A. Lester

[57] ABSTRACT

An optical time-domain reflectometry (OTDR) system comprises an oscillator, a phase shifter, an amplifier, an optical pulse generator, an integrated electro-optical circuit, a detector, a timer, a converter, and an output device. The OTDR system can be used to determine which surface of a photographic lens is impairing transmissivity the most. When the amplifier is enabled, a signal from the oscillator starts the timer and triggers the pulse generator. The timer is a time-to-digital circuit with analog interpolation. The resulting pulse is transmitted through the integrated electro-optical circuit and into the lens being evaluated. The strongest reflection from the lens is detected and the resulting detection signal stops the timer. The timed duration is expressed by the converter as a distance which can be used to identify the lens surface of interest. The result is displayed and/or stored on the output device. An electrical waveform from the oscillator is conveyed along a transmission line defined by electrodes of the integrated electro-optical circuit. This waveform introduces phase distortion in the optical pulse conveyed along an optical path of the integrated electro-optical circuit. The phase shifter is programmed so that these phase distortions are approximately quadratic over the pulse duration, so that the frequency of the pulse is "swept" linearly. The integrated electro-optical circuit includes a dispersive grating which introduces time delay as a function of frequency. The combination of sweeping and dispersing results in a pulse which is compressed relative to its original form. The compressed pulse allows more precise identification of the surface causing the strongest reflection so that modern multi-element lenses can be effectively evaluated.

5 Claims, 5 Drawing Sheets

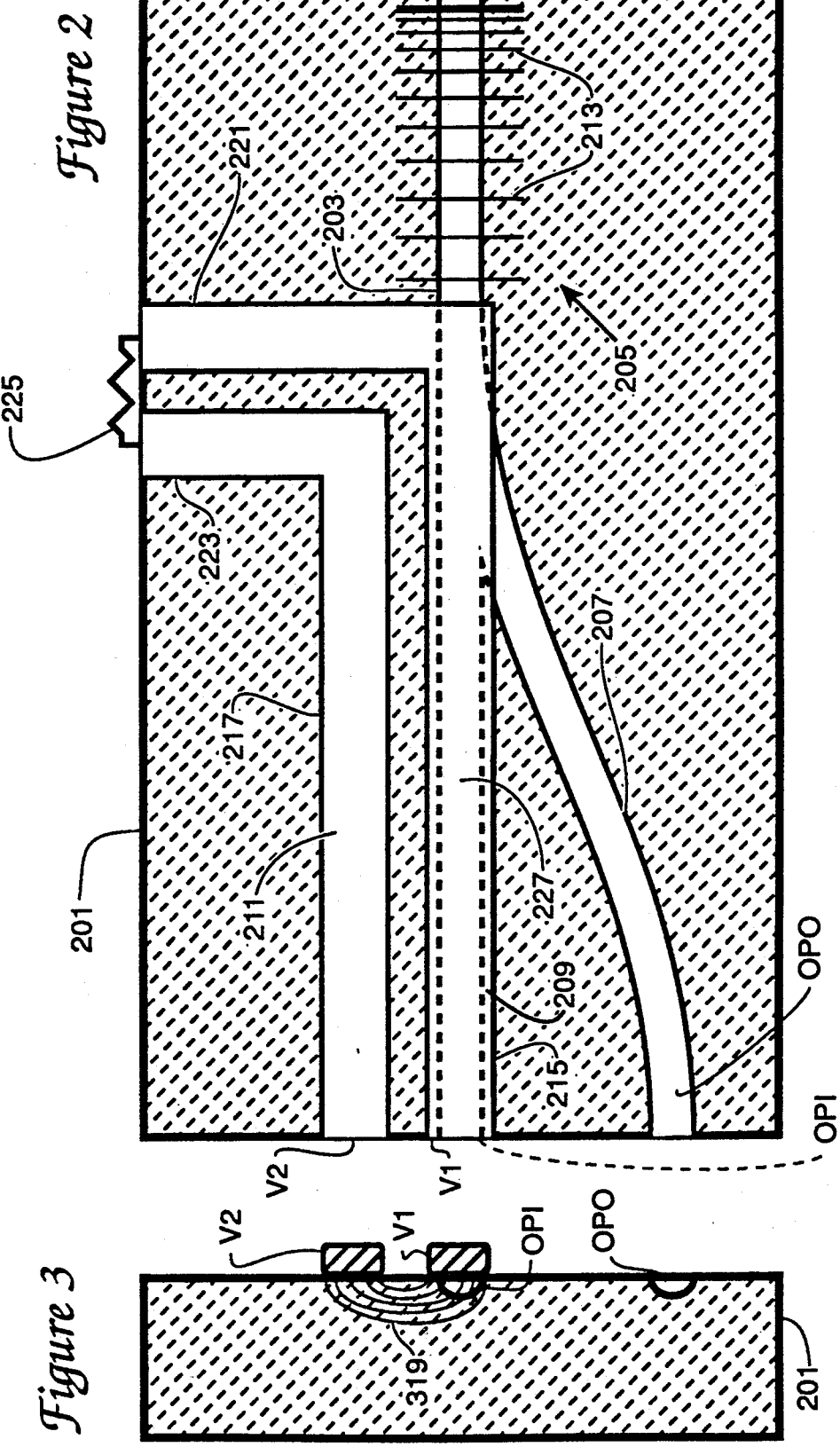

HIGH TEMPORAL RESOLUTION OPTICAL INSTRUMENT

BACKGROUND OF THE INVENTION

The present invention relates to optical instruments and, more particularly, to an optical time-domain reflectometry system including a novel pulse source.

Optical time-domain reflectometry (OTDR) is an approach to characterizing objects by measuring the duration between transmission of a pulse and its detection upon reflection. For example, OTDR can be used to evaluate photonic instruments as well as bulk optical devices such as photographic lenses. A laser pulse directed into a multi-element lens can result in a echo signal with a time-varying intensity, intensity corresponding to reflectivity and time corresponding to distance from the pulse source. Accordingly, the echo signal can be analyzed to determine how much each lens surface reflects light intended to be transmitted therethrough. Moshe Nazarathy et al. in "Real-Time Long Range Complementary Correlation Optical Time Domain Reflectometer", *IEEE Journal of Lightwave Technology*, Vol. 7, No. 1, Jan. 1989, and the references cited therein describe several OTDR systems.

A typical OTDR system uses a transistor to switch a semiconductor laser to generate optical pulses. A counter can be started upon transmission and stopped upon detection of a generated pulse to measure the intervening duration. This duration can be converted to a path distance to locate the source of each reflection. The precision to which distances can be resolved is limited by the pulse-width of the pulse as transmitted as well as by dispersion that occurs between transmission and detection.

By switching a laser diode, optical pulses of 50 picoseconds (ps) are readily attainable. This is sufficient for analyzing simple lenses with elements spaced more than a centimeter apart. High speed laser diodes have been demonstrated which provide 10 ps temporal resolution, sufficing for resolution on the order of a few millimeters.

Modern photographic lenses, especially zoom lenses, can utilize fifteen or more elements. To provide a lens which is reasonably compact, the lens elements must be tightly spaced, typical spacings being less than a few millimeters. Resolving reflections from the surfaces of such closely spaced elements can require OTDR systems with initial pulse widths on the order of 1 ps.

The desired resolution can be obtained by employing high-powered pulsed lasers or bulk optical compressors, as disclosed by Edmond B. Treacy in "Optical Pulse Compression With Diffraction Gratings", *The Journal of Quantum Electronics*, Vol. QE-5, No. 9, September 1969. However, the power and weight of these optical sources make them expensive and awkward. The expense and power requirements can preclude their use in many applications requiring portability. What is needed is an economical OTDR system which can characterize optical components with very high spatial resolution while having modest bulk and power requirements.

SUMMARY OF THE INVENTION

The present invention provides for a portable, high-precision, optical time-domain reflectometry system, as well as related instruments. The system includes a waveform generator for generating an electrical waveform and a pulse generator for generating an optical pulse. An integrated optical circuit includes an optical path for conveying the optical pulse to an integrated frequency dispersive reflective filter. The integrated optical circuit also includes electrodes for conveying the electrical waveform so that an electric field is propagated along the optical path with the pulse. The waveform and pulse are synchronized, for example, by using the waveform generator to trigger the pulse generator.

A detector is used to detect reflections of the pulse off the object or other events of interest resulting from the incidence of the pulse on the object. The duration between pulse onset and the time of detection is used to measure distance or another parameter of interest for characterizing the object. This duration can be determined by coupling a timer to both the waveform generator and the detector.

A phase shifter can be used to provide the desired synchronization between the optical pulse and the electrical waveform. As a first approximation, the optical pulse should be centered at a peak of the electrical waveform. Preferably, this synchronization is maintained for as long as the pulse and electric field are co-propagating. When the electric field and the optical pulse propagate at different rates, this difference is compensated for by adjusting the relative phases so that the accumulated phase retardation is maximal; in the case of a symmetrical Gaussian electrical field distribution, this occurs when the average phase relation taken over the common path length is equal to peak alignment.

The disclosed approach attains greater precision than has heretofore been available without the use of high powered pulsed lasers and comparably burdensome equipment. The basic reason for the precision achieved is the shorter pulse widths relative to other portable systems. The combination of high precision, compactness and low power requirements provides for a more versatile OTDR system. These and other features and advantages provided by the present invention are apparent in the description below with reference to the following drawings.

BRIEF DESCRIPTION OF THE DRAWINGS

FIG. 2 is a plan view of an integrated electro-optical circuit of the system of FIG. 1.

FIG. 3 is an elevational view of the integrated electro-optical circuit of FIG. 1.

Generally, with respect to these figures, the first digit of a three-digit reference number for an element shown in a figure corresponds to the figure number referenced when the element was first discussed in this application. In FIGS. 1 and 5, optical beams and paths are represented by broken lines, while electrical paths are shown as solid lines.

DESCRIPTION OF THE PREFERRED EMBODIMENTS

Figure 1:
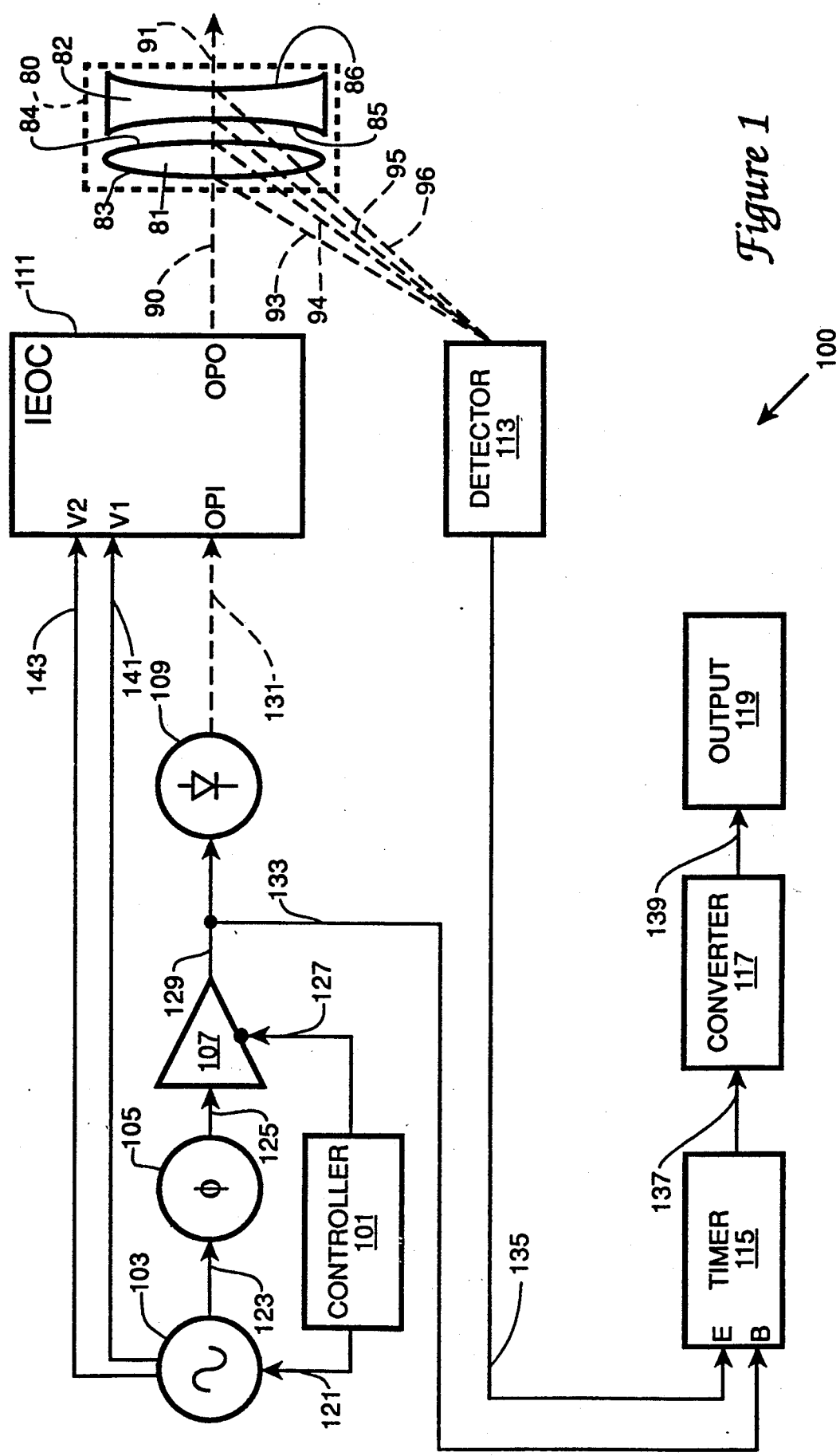
FIG. 1 is a schematic illustration of a first optical time-domain reflectometry system arranged to evaluate a lens in accordance with the present invention.

The present invention provides an optical time-domain reflectometry system 100 for characterizing a composite lens 80 having a convex element 81 and a concave element 82, shown in FIG. 1. Optical time-domain reflectometry system 100 transmits one or a series of optical pulses 90 through lens 80. Concave element 82 includes a front concave surface 85 and a rear concave surface 86, and convex element 81 includes a front concave surface 83 and a rear concave surface 84. The energy of the lens output 91 is diminished by the energy distributed to reflections 93-96 off the respective surfaces 83-86. By identifying the surfaces causing the greatest loss of transmission, optical time-domain reflectometry system 100 can indicate which surfaces might be candidates for different optical coatings, for example.

Optical time-domain reflectometry system 100 comprises a controller 101, an oscillator 103, a phase shifter 105, an amplifier 107, an optical pulse generator 109, an integrated electro-optical circuit (IEOC) 111, a detector 113, a timer 115, a converter 117, and an output device 119, which can be a display and/or storage device. When activated by controller 101 via line 121, oscillator 103 generates a waveform along line 123. After being phase shifted by phase shifter 105, this waveform is received by amplifier 107 via line 125. When amplifier 107 is enabled by controller 101 via line 127, an amplified version of the waveform is transmitted along line 129 to trigger optical pulse generator 109.

Optical pulse generator 109 can include a transistor switched laser diode to produce an optical pulse, preferably with an initial duration about 10-20 ps. The optical pulse is optically coupled to the optical pulse input OPI of integrated electro-optical circuit 111 via an optical fiber 131. The optical pulse is compressed, as described below, due to the action of complementary electrical signals received from waveform generator 103 at input V1 along line 141 and input V2 along line 143. The resulting compressed optical pulse 90 is transmitted from optical output OPO of integrated electro-optical circuit 111 toward lens element 80.

Detector 113 provides an electrical detection signal in response to detected reflections 93-96 from surfaces 83-86. Detector 113 has a variable threshold output which is gradually lowered during a succession of optical transmission pulses. Once the threshold decreases sufficiently, detector 113 provides an electrical pulse corresponding to the strongest of reflections 93-96.

A trigger pulse from amplifier 107 is directed along line 133 to the "begin" input B of timer 115, while the output of detector 113 is directed along line 135 to the "end" input E of timer 115. Timer 115 is a time-to-digital converter with an analog interpolation circuit with an accuracy of 6 ps or less. With the exceptions of a higher clock rate and finer interpolation resolution, it is similar to that described by Juha Kostamovaara and Risto Myllyla in "Time-To-Digital Converter With An Analog Interpolation Circuit", *Review of Scientific Instruments*, Vol. 57, No. 11, November 1986.

The output of timer 115 is a digital representation of the time between pulse triggering and detection of the resulting reflection. Converter 117 receives this timer output along line 137 and converts it to a distance indicating the position of strongest reflection with about 1 millimeter precision, which is sufficient to distinguish among surfaces 83-86. This position is transmitted along line 139 to be displayed and/or stored by output device 119.

Amplifier 107 produces a limited output and thus a sharp transition for optical pulse generator 109. An operator can interface with controller 101 to select between a repetitive mode and a single-shot mode. In the repetitive mode, a series of pulse and waveform pairs are transmitted through integrated electro-optical circuit 111. In the single-shot mode, controller 101 disables amplifier 107 via line 127 after a single pulse is transmitted to integrated electro-optical circuit 111.

Integrated electro-optical circuit 111 includes a substrate 201, an input optical path 203, a dispersive grating 205, an output optical path 207, a first electrode 209 and a second electrode 211, as shown in FIGS. 2 and 3. Substrate 201 is of lithium niobate crystal ($LiNbO_3$). Optical path 207 is defined by diffusing titanium into substrate 201, as disclosed by David W. Dolfi in "Traveling Wave 1.3-$\mu$m Interferometer Modulator with High Bandwidth, Low Drive Power, and Low Loss", *Applied Optics*, Vol. 25, page 2479, Aug. 1, 1986, and references cited therein. Input optical path 203 extends from pulse input OPI of integrated electro-optical circuit 111 through dispersive grating 205.

Dispersive grating 205 comprises a series of spatial perturbations 213 formed on input optical path 203 using a refinement of a procedure disclosed by S. T. Peng et al., in "Theory of Periodic Dielectric Waveguides", *IEEE Transactions on Microwave Theory and Techniques*, Vol. MTT-23, No. 1, January 1975. The pitch of grating 205 decreases from half the longest wavelength transmitted along input optical path 203 down to half the shortest wavelength transmitted along input optical path 203. Spatial perturbations 213 are written by electron-beam exposure from a nanolithographic system.

Longer wavelengths are reflected before shorter wavelengths, which must travel further to encounter perturbations on a pitch corresponding to the half-wavelength required for constructive interference with the reflection back along output optical path 207. Thus, grating 205 serves to introduce differential delays as a function of frequency in a pulse during reflection. Some of the energy of the reflected and dispersed pulse is coupled into output path 207 along which it is directed to pulse output OPO.

Electrodes 209 and 211 have parallel longitudinal segments 215 and 217, respectively, so that electrical currents therethrough can cause an electric field 319 to propagate through input optical path 203, as shown in FIG. 3. Specifically, electrode 209 is formed over input optical path 203 on the surface of substrate 201, and electrode 211 is also formed on the surface of substrate 201 but spaced from input optical path 203. Electric field 319 is non-zero when and where a potential difference exists between electrodes 209 and 211. Electrodes 209 and 211 include transverse segments 221 and 223, respectively, which have minimal interaction with the pulse after reflection. Segments 221 and 223 are connected through a terminating resistor 225 formed at an edge of substrate 201.

Electrodes 209 and 211 are formed by gold electroplating through a thick patterned photoresist up to a thickness of about 3 $\mu$m. The electrodes have widths of approximately 24 $\mu$m and are spaced about 6 $\mu$m apart. Optical paths 203 and 207 are defined by titanium diffusions which are about 6 $\mu$m wide and 650 Å thick.

The transmission line defined by electrodes 209 and 211 establishes an electric field at input optical path 203 varies sinusoidally in time at radian frequency $\omega_m(t)$ and by position at any given time. Phase shifter 105 is controlled so that the peak of an optical pulse coincides with the peak of the concurrent electric field, at least near the middle 227 of the length of co-propagation of pulse and electric field. The preferred phase relationship of an optical pulse and field 319 is shown with a solid sinusoidal line 429 in FIG. 4.

Figure 4:
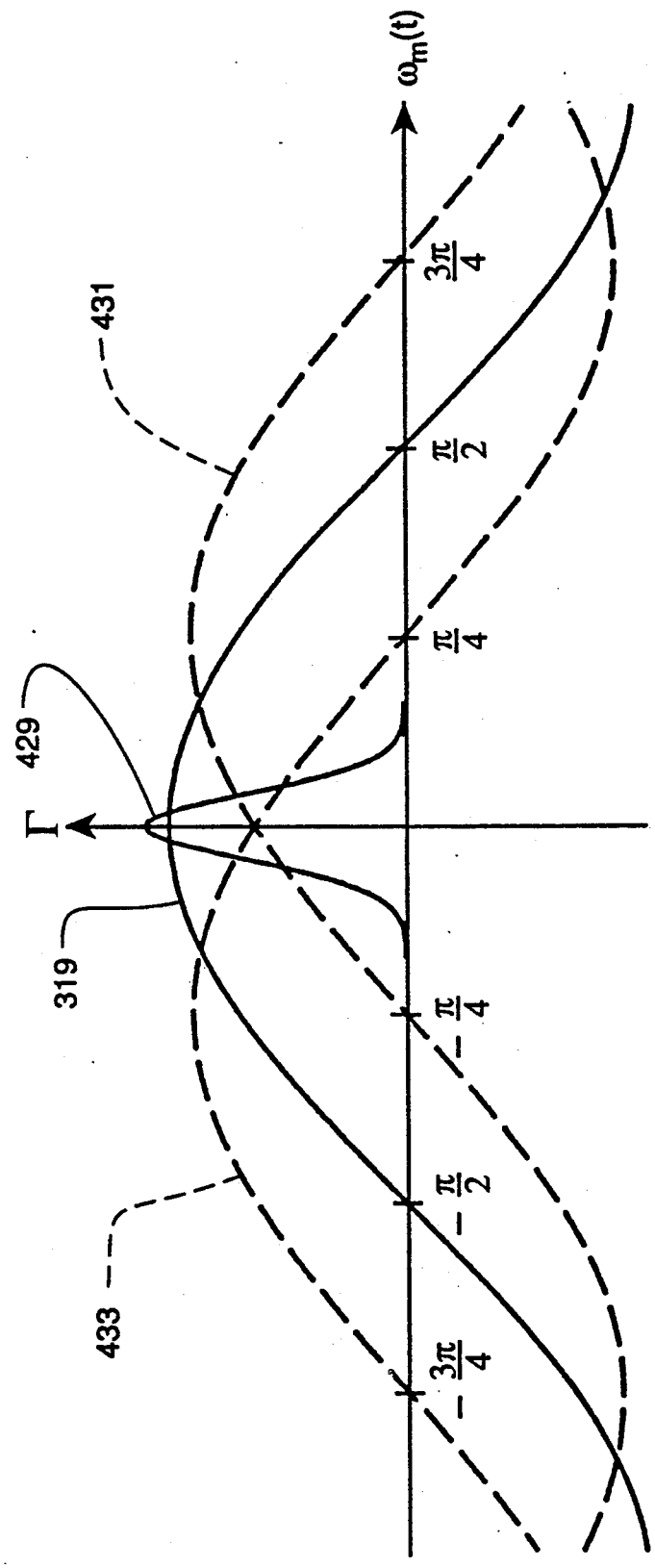
FIG. 4 is a graph illustrating the preferred synchronization of an optical pulse with an electrical waveform in the system of FIG. 1.

FIG. 4 depicts the effects of a velocity mismatch on the total phase shift accumulated by the optical pulse. The abscissa is $\omega_m(t)$ in units of phase of the modulating electric field. The ordinate is the total accumulated optical phase $\Gamma$ after propagation of the modulating electric field. Line 319, in the form of a solid cosine, represents the total phase shift for the case of perfect velocity match between the electric field and an optical pulse 429, depicted in FIG. 4 by its Gaussian envelope. When the pulse is short compared to the modulating electric field period, the phase shift is predominantly quadratic.

Dashed line 431 represents the accumulated phase shift for an optical pulse proceeding more slowly than the co-propagating electric field; it has suffered a $\pi/2$ radian phase lag. Dashed line 433 represents the phase shift for an optical pulse proceeding faster than the copropagating electric field; it has suffered a $\pi/2$ radian phase lead. In either case, the position of the quadratic phase has shifted with respect to the optical pulse envelope and, as a result, the peak phase shift is reduced. By injecting the optical pulse with a phase delay or advance of $\pi/4$, using phase shifter 105, the pulse would once again be centered under the quadratic portion of the phase curve, although the peak amplitude of the phase would remain diminished. In general, a phase walkoff of $\Delta\phi$ can be compensated by a preliminary phase offset of $-\Delta\phi/2$.

Electric field 319 introduces phase distortions in optical pulse 429, which vary according to the strength of the local electric field. The duration of optical pulse 429 is much shorter than the period of electric field 319 so that the pulse is essentially maintained within a single peak of electric field 319. A sinusoid is approximately quadratic about its peak so that the phase distortion imposed on pulse 429 varies quadratically over its width. Since frequency is the time derivative of phase and since the derivative of a quadratic function is linear, the electric field imposes a linear frequency sweep on pulse 429.

This frequency swept pulse is then dispersed in time as a function of frequency by dispersive grating 205. This sweeping and dispersing combination has its counterpart in "chirped" radar. Radar pulses can be swept and dispersed, i.e., "chirped", to provide higher peak power than would otherwise be attainable. In the present OTDR application, a reduction in pulse width, from about 10 ps to about 1 ps is attainable. This shorter pulse width contributes to the improved precision of optical time-domain reflectometry system 100.

Figure 5:
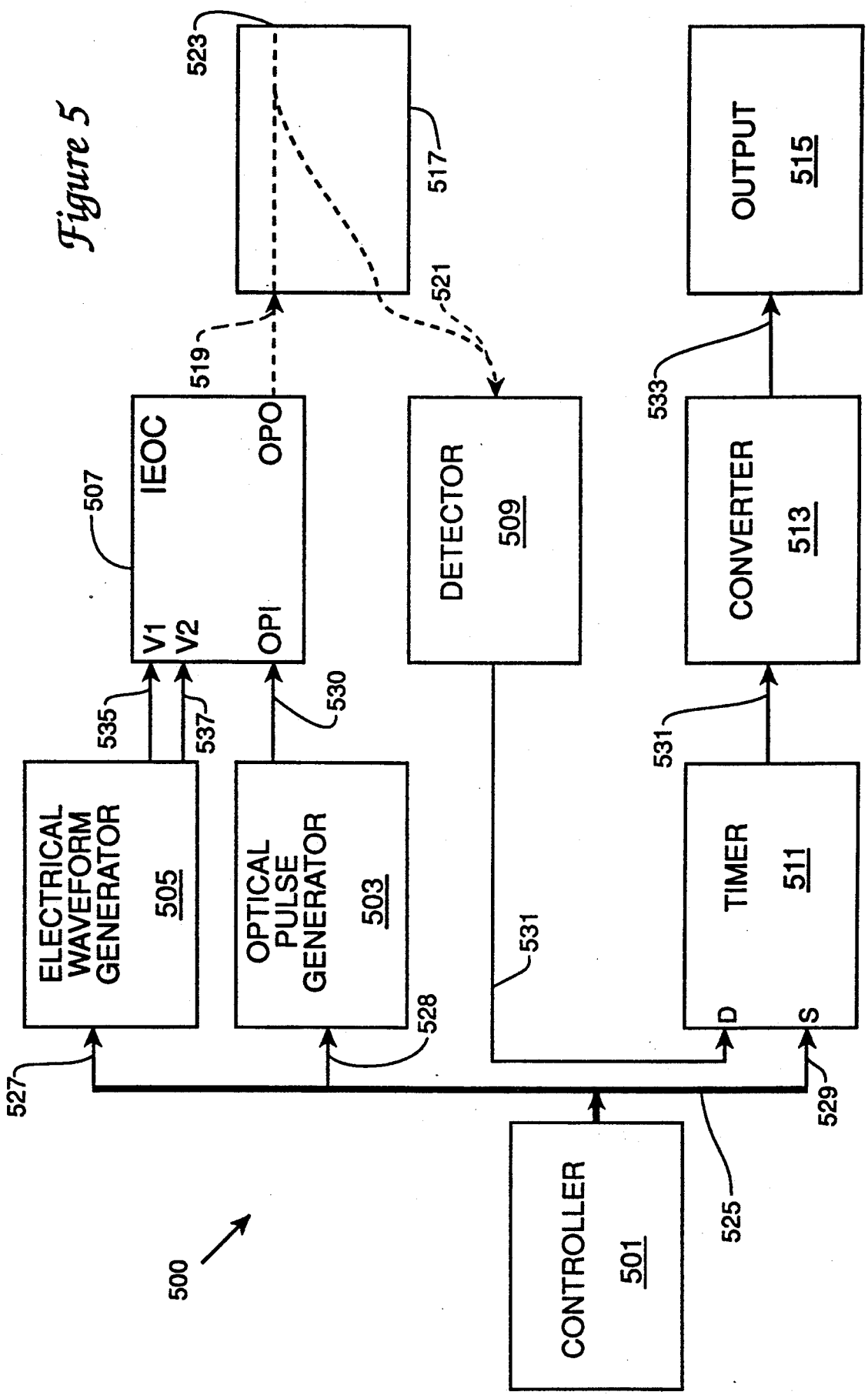
FIG. 5 is a schematic illustration of another optical time-domain reflectometry system in accordance with the present invention.

An alternative optical time-domain reflectometry system 500 comprises a controller 501, an optical pulse generator 503, an electrical waveform generator 505, an integrated electro-optical circuit 507, a detector 509, a timer 511, a parameter converter 513, and an output device 515, as shown in FIG. 5. A Y-connector 517 provides for optical communication with optical pulse output OPO of integrated electro-optical output circuit 507 via an optical fiber 519 and for optical communication with detector 509 via optical fiber 521. The output 523 of Y-connector 517 can transmit an optical pulse through air or other medium. Alternatively, a photonic circuit can be evaluated by connecting an optical fiber between it and Y-connector output 523.

Controller 501 can be programmed to set the phase relationships discussed above with respect to OTDR system 100 between the signals it activates. Controller 501 communicates with other components via a control bus 525. Electrical waveform generator 505 is coupled to control bus 525 via line 527, and optical pulse generator 503 is coupled to control bus 525 via line 528. The output of optical pulse generator 503 is coupled to the optical input OPI of integrated electro-optical circuit 507 via optical fiber 530.

Optical pulse generator 505, converter 513 and output device 515 are essentially similar to the corresponding components of OTDR system 100. Detector 509 provides a time-varying detection signal corresponding to the time-varying intensity detected. Controller 501 provides a synchronization signal along bus 525 and line 529 to a synchronization input S of timer 511. The synchronization signal is used by timer 511 as a reference to evaluate the detection signal. The detection signal is received, via line 531, at the data input D of timer 511. The time of detection relative to pulse triggering is used to determine the relationship between detection intensity and delay data. Converter 513 receives delay data along line 531 and converts it to position data. The position data is transferred along line 533 to output device 515, which can include an oscilloscope, for display. The result is a graph of intensity versus position that can be used to identify the surfaces reflecting the most light.

Waveform generator 505, which can be a frequency generator, is designed to generate a cyclical waveform which is approximately quadratic over a half cycle. Complementary waveforms from waveform generator 505 are transmitted to the electrical inputs V1 and V2 of integrated electro-optical circuit 507 via lines 535 and 537 respectively.

Figure 6:
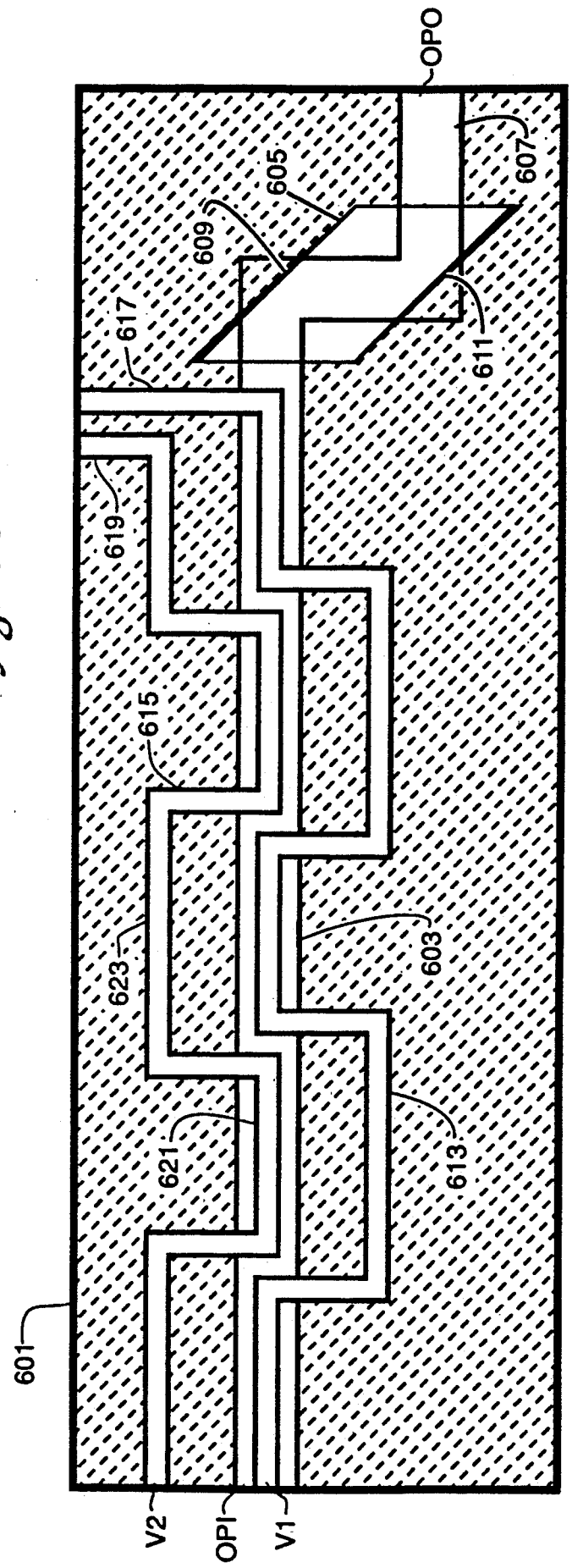
FIG. 6 is a plan view of an integrated electro-optical circuit of the system of FIG. 5.

Integrated electro-optical circuit 500 includes a substrate 601 with an input optical path 603 from pulse input OPI to a dispersive region 605 and a second optical path 607 from dispersive region 605 to pulse output OPO, as shown in FIG. 6. Paths 603 and 607, as well as dispersive region 605, are doped with titanium for light transmission. Region 605 is bounded by parallel diffraction gratings 609 and 611 formed at the surface of substrate 601. Diffraction grating 609 is arranged to reflect an optical pulse received along input optical path 603 toward diffraction grating 611, which in turn redirects the pulse along output path 607. The effect of parallel diffraction grating 609 and 611 is analogous to that of grating 205 in optical time-domain reflectometry system 100.

The pair of diffraction gratings 609 and 611 are analogous to grating 205 in that both serve to compress a previously distorted pulse. The pair of diffraction gratings 609 and 611 advances shorter wavelengths relative to longer wavelengths; thus this pair compresses a pulse distorted so that longer wavelengths lead shorter wavelengths. Grating 205 advances longer wavelengths relative to shorter wavelengths, and thus compresses a pulse distorted so that shorter wavelengths lead longer wavelengths. Thus, the present invention provides for compression of pulses distorted either so that shorter wavelengths lead or so that longer wavelengths lead.

Integrated electro-optical circuit 507 also includes a pair of electrodes 613 and 615, which cooperate to define a transmission line. Electrodes 613 and 615 are roughly in the form of spatial square waves over the length of copropagation of the electrical waveform and optical pulse so that they alternate covering input optical path 603. The length of copropagation is the length along input optical path 603 affected by the electric field between electrodes 613 and 615; the length of copropagation is, approximately, the longitudinal extent of electrode 615.

The dimensions and materials of electrodes 613 and 615 and optical paths 603 and 607 are similar to those of the corresponding components illustrated in FIG. 2. Specifically, electrodes 613 and 615 are wider than optical path 603; FIG. 6 shows this relationship in reverse to better convey the relationships between the electrical and optical paths. For each electrode 613, 615, the longitudinal segments over optical path 603 are shorter than the longitudinal segments away from optical path 603. For example, segment 621 of electrode 615 is shorter than segment 623 of electrode 623. This avoids shorting of the electrodes over optical path 603.

Electrodes 613 and 615 include resistively coupled transverse segments 617 and 619. The period of the spatial square waves relates to the differences in velocity between the optical pulse and the phase-modulating electric field. This arrangement avoids the undoing of phase distortion by sign changes in the electric field that might otherwise be imposed on the optical pulse in the case of relatively large differences in velocity between the optical pulse and the electric field.

The present invention provides for embodiments other than those described above. For example, either integrated electro-optical circuit 111, 507 can be adapted for inclusion in either optical time-domain reflectometry system 100, 500. Where only one pulse is used to locate a defect, there is no need for the electrical waveform to be periodic. A solitary quadratic electrical waveform can be used to introduce phase distortion in the optical pulse. Suitable electro-optical materials other than lithium niobate can be used for the substrate of the integrated electro-optical circuit.

While the foregoing embodiments have focussed on time-domain reflectometry, the present invention provides for other applications as well. For example, the output of the integrated electro-optical circuit can be used to characterize a detector. In this case, the detector is as much an object of investigation as it is an integral part of the system. In other applications, the event detected need not be a reflection. For example, the optical pulse could be used to trigger an emission from some chemical composition. This emission can be detected and the delay between the pulse and the emission can be used to characterize the composition or the emissive process. These and other modification to and variations upon the described embodiments are provided for by the present invention, the scope of which is limited only by the following claims.

What is claimed is:

1. A system comprising:
   a substrate;
   a first optical path formed on said substrate, said first optical path having a first input and a first output;
   a second optical path formed on said substrate, said second optical path having a second input and a second output;
   reflective dispersion means for dispersing optical energy as a function of frequency, said reflective dispersion means being formed on said substrate generally at the location of said first output and said second input so as to reflect and disperse as a function of frequency light transmitted along said first optical path from said first input so that the resulting reflections can be coupled into said second optical path and be transmitted from said second output;
   electrical path means for propagating an electric field along said first optical path, said electrical path means being formed on said substrate;
   optical source means for generating an optical input pulse having a peak and a characteristic pulse width;
   electrical source means for generating an electrical waveform having a peak and a characteristic width substantially longer than the pulse width of said optical input pulse; and
   controller means for activating said optical source means and said electrical source means so that said electrical waveform is co-propagated with said optical input pulse and so that on an average taken over the length of co-propagation said peak of said optical input pulse is substantially aligned with said peak of said electrical waveform;
   whereby said electrical waveform introduces phase distortion in said optical pulse, said phase distortion varying spatially over the length of said pulse, whereby the resulting phase distorted optical pulse is reflected by said reflective dispersion means so that the resulting optical output pulse has a substantially shorter pulse width than said optical input pulse, and whereby said optical output pulse is coupled into said second optical path and transmitted from said output end.

2. The system of claim 1 wherein said electrical source means generates a waveform selected to establish a phase distortion that varies quadratically on said optical input pulse.

3. The system of claim 1 further comprising means for adjusting the initial relative phase of said optical input pulse and said electrical waveform to compensate for differences in their velocities of propagation.

4. The system of claim 1 wherein said dispersion means includes a grating with spatial perturbations extending generally orthogonally to said first optical path.

5. The system of claim 1 wherein said dispersion means includes parallel diffraction gratings formed on said substrate and extending obliquely relative to said first optical path.

* * * * *

UNITED STATES PATENT AND TRADEMARK OFFICE
CERTIFICATE OF CORRECTION

PATENT NO. : 5,033,826
DATED : July 23, 1991
INVENTOR(S) : Brian H. Kolner

It is certified that error appears in the above-indentified patent and that said Letters Patent is hereby corrected as shown below:

Column 3, line 12, "concave surface 83" should read -- convex surface 83 --;

Column 3, line 12, "concave surface 84" should read -- convex surface 84".

Signed and Sealed this

Seventh Day of June, 1994

Attest:

BRUCE LEHMAN

Attesting Officer      Commissioner of Patents and Trademarks